US007339690B2

(12) United States Patent
Lenz et al.

(10) Patent No.: US 7,339,690 B2
(45) Date of Patent: Mar. 4, 2008

(54) IDENTIFICATION CARD PRINTER WITH CLIENT/SERVER

(75) Inventors: Gary A. Lenz, Eden Prairie, MN (US); Robert J. Innes, Savage, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 505 days.

(21) Appl. No.: 10/176,096

(22) Filed: Jun. 20, 2002

(65) Prior Publication Data

US 2003/0090712 A1 May 15, 2003

Related U.S. Application Data

(63) Continuation-in-part of application No. 09/614,825, filed on Jul. 12, 2000, now abandoned.

(60) Provisional application No. 60/143,731, filed on Jul. 14, 1999.

(51) Int. Cl.
G06K 1/00 (2006.01)
G06F 15/00 (2006.01)

(52) U.S. Cl. .................... 358/1.15; 358/1.18; 235/436; 235/380

(58) Field of Classification Search .......... 358/1.1–1.9, 358/1.11–1.18; 101/35; 283/107, 109, 110, 283/111; 235/436, 380
See application file for complete search history.

(56) References Cited

U.S. PATENT DOCUMENTS

| 3,193,430 | A | 4/1960 | Messmer et al. ........... 156/355 |
|---|---|---|---|
| 3,889,472 | A | 6/1975 | Guillaud ....................... 60/698 |
| 3,960,072 | A | 6/1976 | Ahlgren et al. ................ 101/35 |
| 4,068,028 | A | 1/1978 | Samonides .................... 428/40 |
| 4,146,900 | A | 3/1979 | Arnold ......................... 346/75 |
| 4,179,732 | A | 12/1979 | Khan et al. .................. 364/200 |
| 4,282,583 | A | 8/1981 | Khan et al. .................. 364/900 |
| 4,313,683 | A | 2/1982 | Brown et al. ................ 400/225 |
| 4,393,386 | A | 7/1983 | Di Giulio ..................... 346/75 |
| 4,534,313 | A | 8/1985 | Louvel ........................ 118/696 |

(Continued)

FOREIGN PATENT DOCUMENTS

EP  1488303  B1  3/2003

OTHER PUBLICATIONS

Business Wire, Inc. article, entitled "OrdaCard announces new Internet based high volume secured photo ID card production services," dated Oct. 23, 1998.

(Continued)

*Primary Examiner*—Douglas Q. Tran
*Assistant Examiner*—Satwant Singh
(74) *Attorney, Agent, or Firm*—Westman, Champlin & Kelly, P.A.

(57) ABSTRACT

An identification card printer for printing an image on an identification card, is provided which includes a print mechanism adapted to deposit material on to the card. A network adapter is configured to couple to a network. A print drive module controls the print mechanism in response to a drive module input. A client/server module is coupled to the network adapter and functions as a client on the network to responsively provide data to the drive module input. The client/server module can further function as a server on the network to serve data to the network.

59 Claims, 3 Drawing Sheets

U.S. PATENT DOCUMENTS

| | | | |
|---|---|---|---|
| 4,604,631 A | 8/1986 | Jinnai et al. | 346/1.1 |
| 4,617,080 A | 10/1986 | Kobayashi et al. | 156/359 |
| 4,680,596 A | 7/1987 | Logan | 346/140 |
| 4,685,702 A | 8/1987 | Kazuharu | 283/81 |
| 4,686,540 A | 8/1987 | Leslie et al. | 346/33 |
| 4,716,346 A | 12/1987 | Matsuo | 318/38 |
| 4,719,626 A | 1/1988 | Ogasawara | 371/16 |
| 4,734,868 A | 3/1988 | DeLacy | 364/519 |
| 4,781,985 A | 11/1988 | Desjarlais | 428/421 |
| 4,938,830 A | 7/1990 | Cannistra | 156/270 |
| 5,027,135 A | 6/1991 | Negishi et al. | 346/154 |
| 5,161,233 A | 11/1992 | Matsuo et al. | 355/218 |
| 5,238,524 A | 8/1993 | Seki et al. | 156/538 |
| 5,277,501 A | 1/1994 | Tanaka et al. | 400/120 |
| 5,290,067 A | 3/1994 | Langen | 283/60.1 |
| 5,326,179 A | 7/1994 | Fukai et al. | 400/120 |
| 5,327,201 A | 7/1994 | Coleman et al. | 355/278 |
| 5,368,677 A | 11/1994 | Ueda et al. | 156/362 |
| 5,378,884 A | 1/1995 | Lundstrom et al. | 235/441 |
| 5,410,642 A | 4/1995 | Hakamatsuka et al. | 395/113 |
| 5,412,779 A | 5/1995 | Motoyama | 395/275 |
| 5,413,532 A | 5/1995 | Raby | 462/2 |
| 5,437,960 A | 8/1995 | Nagate et al. | 430/256 |
| 5,441,921 A | 8/1995 | Verdonck et al. | 503/227 |
| 5,455,611 A | 10/1995 | Simon et al. | 347/49 |
| 5,466,319 A | 11/1995 | Zager et al. | 156/220 |
| 5,484,502 A | 1/1996 | Bozanic | 156/235 |
| 5,516,218 A | 5/1996 | Amano et al. | 400/535 |
| 5,537,554 A | 7/1996 | Motoyama | 395/280 |
| 5,544,289 A | 8/1996 | Motoyama | 395/280 |
| 5,550,735 A * | 8/1996 | Slade et al. | 700/99 |
| 5,550,984 A | 8/1996 | Gelb | 395/200.17 |
| 5,552,994 A | 9/1996 | Cannon et al. | 364/468.01 |
| 5,568,618 A | 10/1996 | Motoyama | 395/280 |
| 5,573,621 A | 11/1996 | Boreali | 156/256 |
| 5,637,174 A * | 6/1997 | Field et al. | 156/256 |
| 5,646,388 A | 7/1997 | D'Entremont et al. | 235/380 |
| 5,649,120 A | 7/1997 | Motoyama | 395/280 |
| 5,673,076 A | 9/1997 | Nardone et al. | 347/171 |
| 5,695,589 A | 12/1997 | German et al. | 156/250 |
| 5,709,484 A | 1/1998 | Dorner | 400/188 |
| 5,715,381 A * | 2/1998 | Hamilton | 358/1.15 |
| 5,717,776 A | 2/1998 | Watanabe | 382/116 |
| 5,727,137 A | 3/1998 | LeClair et al. | 375/116 |
| 5,745,036 A | 4/1998 | Clare | 340/572 |
| 5,758,184 A | 5/1998 | Lucovsky et al. | 395/826 |
| 5,768,184 A | 6/1998 | Fujimoto | 364/479 |
| 5,768,483 A * | 6/1998 | Maniwa et al. | 358/1.15 |
| 5,768,495 A | 6/1998 | Campbell et al. | 395/183.01 |
| 5,771,058 A | 6/1998 | Kobayashi | 347/218 |
| 5,771,071 A * | 6/1998 | Bradley et al. | 348/335 |
| 5,771,382 A | 6/1998 | Wang et al. | 395/670 |
| 5,774,678 A | 6/1998 | Motoyama | 395/280 |
| 5,783,024 A | 7/1998 | Forkert | 156/351 |
| 5,785,224 A | 7/1998 | Nowakowski | 225/4 |
| 5,796,420 A | 8/1998 | Kaerts et al. | 347/188 |
| 5,805,810 A | 9/1998 | Maxwell | 395/200.36 |
| 5,807,461 A | 9/1998 | Hagstrom | 156/361 |
| 5,819,110 A | 10/1998 | Motoyama | 395/835 |
| 5,822,534 A | 10/1998 | Yamunachari et al. | 395/200.54 |
| 5,828,567 A | 10/1998 | Eryurek et al. | 364/184 |
| 5,835,911 A | 11/1998 | Nakagawa et al. | 707/203 |
| 5,837,991 A | 11/1998 | LaManna et al. | 235/475 |
| 5,860,068 A | 1/1999 | Cook | 705/26 |
| 5,862,260 A | 1/1999 | Rhoads | 382/232 |
| 5,873,606 A | 2/1999 | Haas et al. | 283/75 |
| 5,874,145 A | 2/1999 | Waller | 428/42.1 |
| 5,884,014 A | 3/1999 | Huttenlocher et al. | 395/114 |
| 5,886,334 A | 3/1999 | D'Entremont et al. | 233/380 |
| 5,887,216 A | 3/1999 | Motoyama | 399/8 |
| 5,936,542 A | 8/1999 | Kleinrock et al. | 340/825.34 |
| 5,941,522 A | 8/1999 | Hagstrom et al. | 271/225 |
| 5,962,832 A | 10/1999 | Dorner | 235/380 |
| 5,973,692 A | 10/1999 | Knowlton et al. | 345/348 |
| 5,980,011 A | 11/1999 | Cummins et al. | 347/4 |
| 6,022,429 A | 2/2000 | Hagstrom | 156/64 |
| 6,024,430 A * | 2/2000 | Koitabashi et al. | 347/17 |
| 6,033,832 A | 3/2000 | Wingender | 430/373 |
| 6,070,146 A | 5/2000 | Mimata | 705/13 |
| 6,100,804 A * | 8/2000 | Brady et al. | 340/572.7 |
| 6,182,136 B1 * | 1/2001 | Ramanathan et al. | 709/224 |
| 6,189,103 B1 * | 2/2001 | Nevarez et al. | 713/201 |
| 6,196,459 B1 | 3/2001 | Goman et al. | 235/380 |
| 6,199,753 B1 | 3/2001 | Tracy et al. | 235/375 |
| 6,219,669 B1 * | 4/2001 | Haff et al. | 707/10 |
| 6,233,683 B1 | 5/2001 | Chan et al. | 713/172 |
| 6,335,799 B1 | 1/2002 | Provost | 358/1.4 |
| 6,512,594 B1 | 1/2003 | Lenz et al. | 358/1.16 |
| 6,543,685 B1 * | 4/2003 | Lien et al. | 235/380 |
| 6,688,519 B2 * | 2/2004 | Vuong et al. | 235/436 |
| 2001/0053947 A1 | 12/2001 | Lenz et al. | 700/117 |

OTHER PUBLICATIONS

Web page entitled Smart ID Card Plastic ID Cards and Card Printing Services, Copyright 1997, Smart ID Card (4 pages).

Web pages entitled "Smart ID Card—Card printing services, ID cards, Card supplies, Smart Card solutions," Copyright 1997, Smart ID Card (5 pages).

Headline article entitled "OrdaCard announces new Internet based high volume secured photo ID card production services," Copyright 1998 Business Wire, Inc. (1 page).

Article entitled "UbiQ Smart Card Software Makes New FARGO Printers Complete Card-Issuance Systems; Issuers Can Print and Personalize Smart Cards Using 'Pro Series' ID Card Printers Combined With ObiQ's Personalization Software LEXIS-NEXIS Related Topics," Copyright 1998 PR Newswire Association, Inc. (2 pages).

International Preliminary Examination Report for International Application No. PCT/US00/34050, filed Dec. 15, 2000, dated Dec. 15, 1999.

U.S. Provisional Patent Application of Gary A. Lenz and Gary M. Klinefelter, U.S. Appl. No. 60/170,987, filed Dec. 15, 1999, entitled "Printer on Laminator With Web Browser".

Detailed Third Office Action for Chinese Patent Application No. 00817078.9 (International Publication No. WO 01/43979) and Letter from China Science Patent & Trademark Agent Ltd. dated Oct. 18, 2005.

Translation of Chinese Patent Application No. CN1216381A, filed Nov. 4, 1997 (10 page specification, 4 pages figures).

* cited by examiner

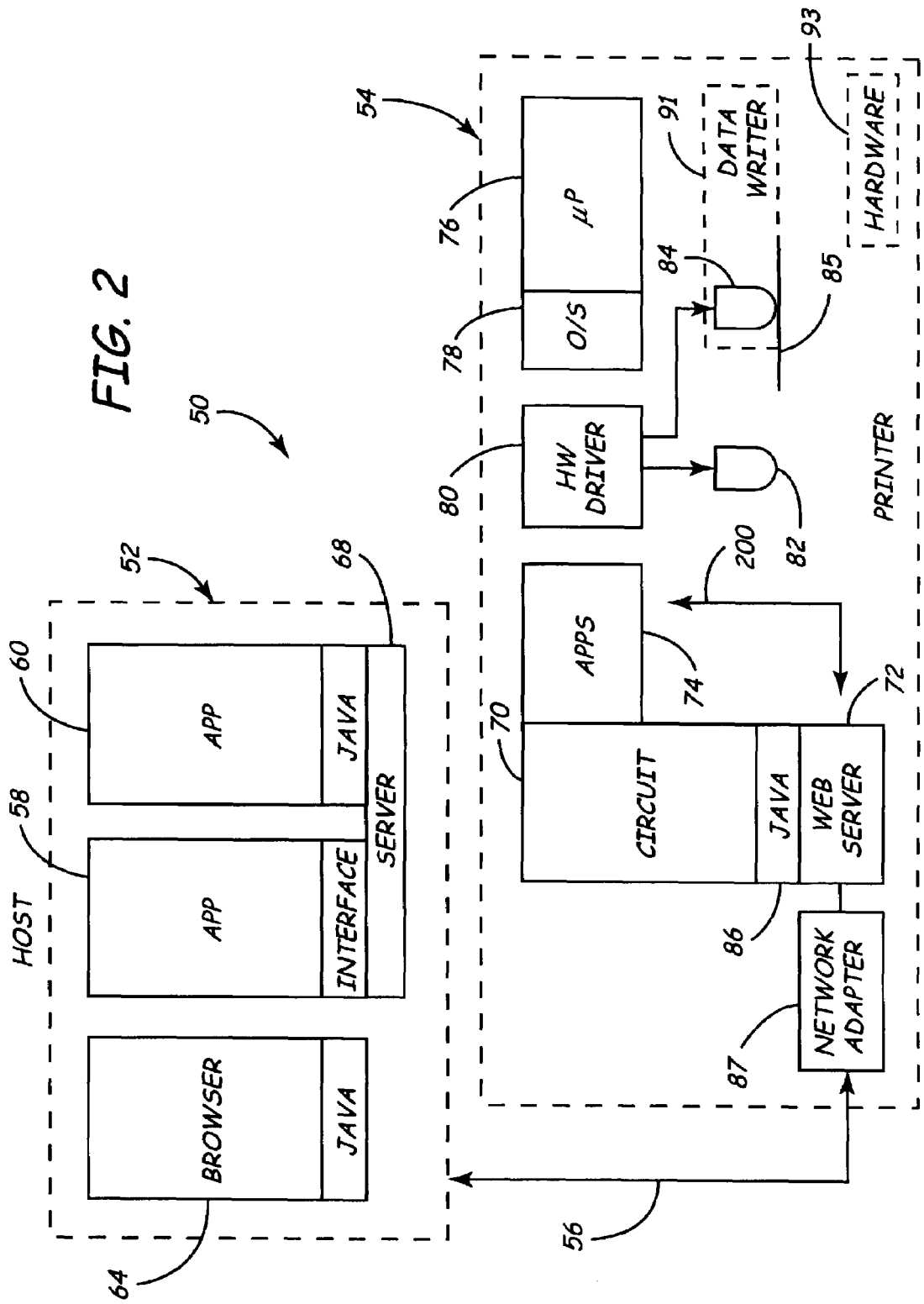

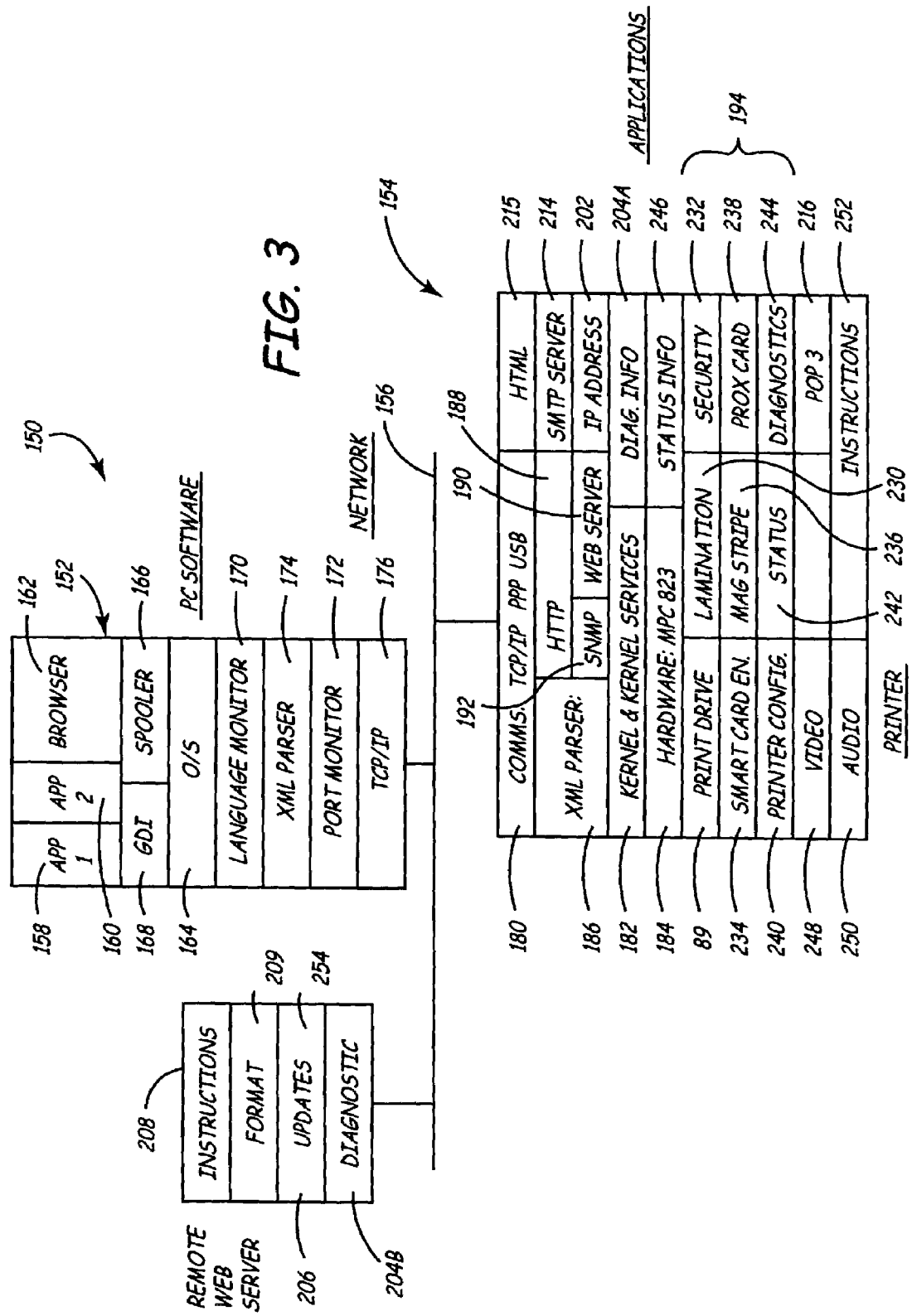

US 7,339,690 B2

IDENTIFICATION CARD PRINTER WITH CLIENT/SERVER

CROSS REFERENCE TO RELATED APPLICATIONS

The present invention is a Continuation-in-Part of U.S. application Ser. No. 09/614,825, and entitled "IDENTIFICATION CARD PRINTER WITH CLIENT/SERVER;" filed Jul. 12, 2000 now abandoned, which in turn claims the benefit of U.S. Provisional Application No. 60/143,731, filed Jul. 14, 1999, and entitled "PRINTER WITH EMBEDDED HYBRID CLIENT/SERVER."

BACKGROUND OF THE INVENTION

The present invention relates to identification cards. In particular, the present invention relates to printers which are used to print identification cards.

Identification cards have found widespread use for carrying identification and security related information for an individual. It is often desirable to create an identification card using an identification card printer. In fact, identification card printers are often used to print large numbers of cards, such as drivers' licenses. Such identification card printers have typically connected to the parallel port of a computer which is used for receiving print data and a serial part which is used for receiving a second type of data such as smart card encoder information.

In general, identification card printers are viewed as output devices which convert a text or image file from a computer application to a visual image on media such as paper or a plastic card. However, identification card printers are actually a unique application because they are both input and output devices. Identification card printers convert an image/text from a host computer application into a visual image on a plastic card. Further, the printer provides full duplex communications to an application resident on the host computer for secure encoding of information from the host to a data media on the card e.g. magnetic stripe, proximity transceiver memory, smart card memory or a microcontroller, for example.

Full duplex communications from the printer over a connection requires the customization of a software driver to provide the necessary Application Programmers Interface (API) to the plethora of applications that may be required to construct a card. Each driver is customized to the printer, host operating system, applications, API's and communications hardware. This customization leads to a large number of drivers which represent a large investment for the printer manufacturer in driver development and a significant confusion for the user as they sort through which driver to use.

The nature of the communication techniques used to communicate with identification card printers has tended to limit their functionality and the efficiency with which they are used. Further, the communication techniques have resulted in a significant portion of the product development budget being consumed by software development required for driver compatibility.

SUMMARY OF THE INVENTION

An identification card printer for printing an image on an identification card, is provided which includes a print mechanism adapted to deposit material on to the card. A network adapter is configured to couple to a network. A print drive module controls the print mechanism in response to a drive module input. A client/server module is coupled to the network adapter and functions as a client on the network to responsively provide data to the drive module input. The client/server module further functions as a server on the network and serve data to the network.

BRIEF DESCRIPTION OF THE DRAWINGS

FIG. 2 is a simplified diagram showing a personal computer coupled to an identification card printer in accordance with one example embodiment of the present invention.

FIG. 3 is a more detailed diagram showing the different hardware and software layers in a personal computer and identification card printer in accordance with the invention.

DETAILED DESCRIPTION OF THE PREFERRED EMBODIMENTS

Figure 1:
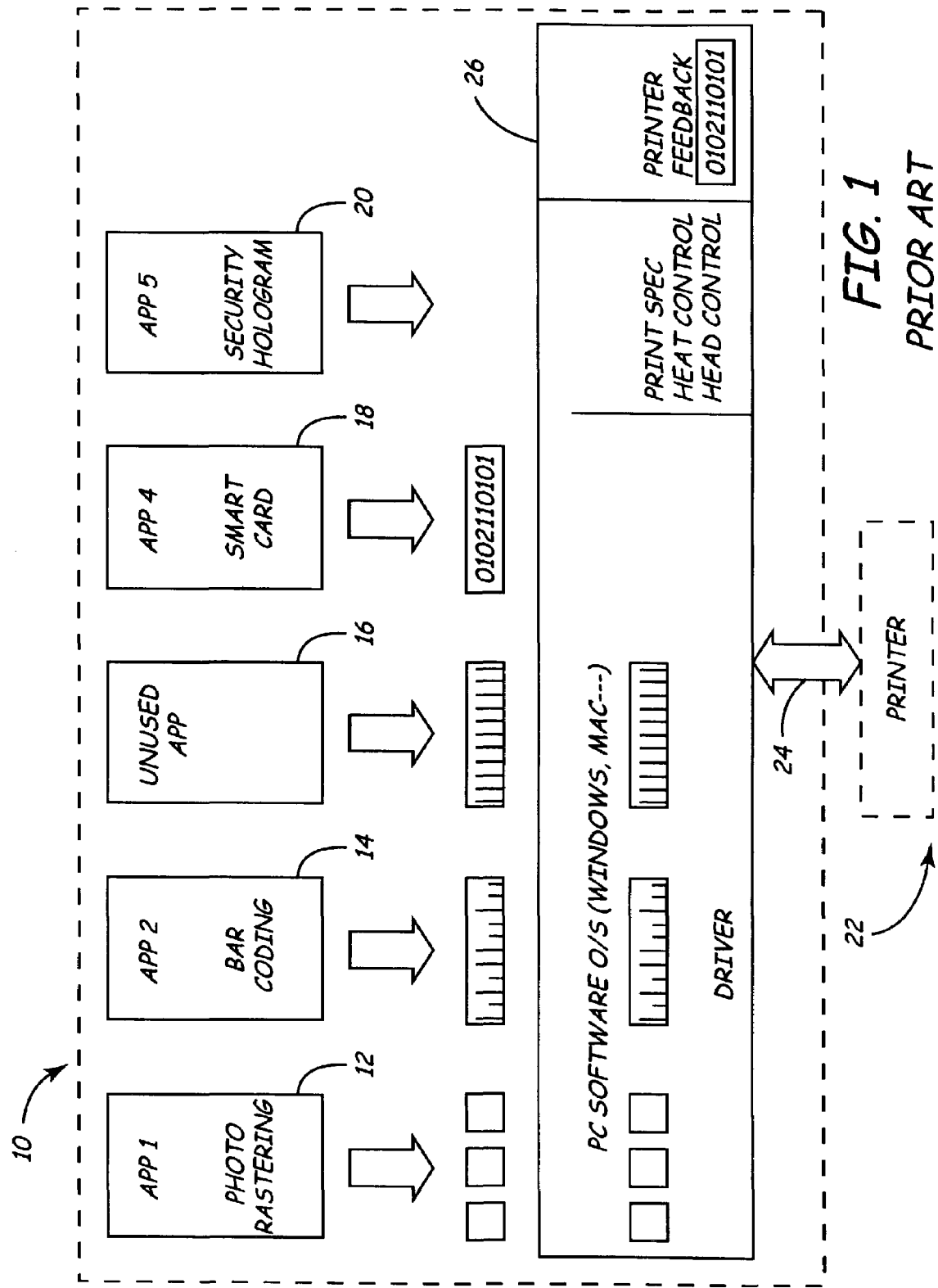
FIG. 1 is a simplified block diagram showing a prior art printer coupled to a personal computer.

The present invention includes an identification card printer, (i.e., a printer used to print onto identification cards), which is capable of communicating using a standardized network communication protocol and/or a standardized object based data structure.

Printers have been connected to host computers via a network or point-to-point communications link such as a serial or parallel port. Applications resident on the host computer process information that is communicated over the network link to an output device, the printer, which converts the information to a visual image on a media such as a paper or plastic card.

However, the plethora of host computer operating systems, networking protocols and application programmer's interfaces (API's) results in a confusing array of printer drivers which are narrowly optimized for a specific printer, host operating system, application API etc. This situation results in confusing for the user of the printer and considerable expense in the driver developer. Identification cards have over laminates that provide for increased card durability and security and use customized hologram secure markings. The lamination process control settings (time, temperature, speed and pressure) are commonly communicated to the printer via a host configuration application. The lamination configuration is commonly provided by an application other than the print image generation application. Identification cards may contain data on a variety of media including magnetic stripes, proximity transceivers with memory and smart card chips. The identification card printer provides the encoding for one or more of these data media. The encoding applications are often provided by several software manufacturers and reside on the host computer. The communication and validation of the information for card encoding adds further complexity to the development of drivers to configure and communicate the necessary data to manufacture a card.

Identification card printers are complex electromechanical devices often having several hundred component parts. It is desirable to provide information on the health of the printer and the status of the card printing and encoding process to a host computer or a networked remote computer for providing a visual alert of problems and for validation of successful encoding. The need to accommodate full duplex communications between the identification card printer and host computer further complicates the development of a driver. Standard operating system driver architectures such as Microsoft Windows, or Macintosh do not typically support full duplex communications and custom "work arounds" are needed for identification card printers.

In one aspect, the invention provides for a printer with an embedded network hybrid client/server that uses standard networking technologies such as OPC, JAVA, and XML (extensible Markup Language) to eliminate or reduce the need for developing drivers that are operating system and printer specific. In one aspect, this is achieved through the use of an object server data communication technique. In one aspect, the data objects can be defined by the communication technique such that new objects can easily be added as new or different printers are introduced.

Identification card printers function as a card manufacturing system. Identification card printers are provided text and image data via a communication interface from a host computer which is running a resident application. Such applications often rasterize an image provided from a digital camera or scanned image and provide the required color settings for the printer's print engine. A typical system is shown in FIG. 1. FIG. 1 shows a prior art printer 22 running five example applications 12, 14, 16, 18, 20 which communicate with printer 22 over a communication link 24. Frequently, link 24 comprises multiple physical links (parallel, serial, etc.) to allow computer 10 to communicate with various hardware elements in printer 22 such as the print mechanism, magnetic stripe encoder, etc. Applications 12-20 operate in accordance with the operating system 26 of the computer 10. Operating system 26 is illustrated as including driver software configured to handle the communications with printer 22. The various applications 12-20 provide, for example, photo-rasterizing, bar coding, smart card preparation and security. The particular data generated by these applications is transferred to the printer 22 in accordance with a proprietary driver running in the operating system 26. This driver also operates in accordance with the specifications of printer 22 and coordinates other printing parameters such as heating control, head control and also handles feedback received from printer 26, for example, which is provided to the smart card application 18. As discussed above, due to the number of different operating systems, applications and communication techniques, a large number of drivers must be created and must be properly configured by the manufacturer and the user.

FIG. 2 is a simplified block diagram showing an identification card printing system 50 which includes a host computer 52 coupled to an identification card printer 54 through a communication network 56. Communication network 56 can be any type of data link, including direct links such as through a universal serial bus (USB), a serial or parallel port of a computer, an infrared link, or more traditional networks such as Ethernet, etc. Network media may be wireless, fiber, wire, coax cable or any future technology where messaging can be transported. The preferred media is Ethernet 10BaseT or 100 MB. Other traditional cabling such as serial, parallel or newer networking such as USB or Firewire may also be used. In general, host computer 52 communicates with identification card printer 54 by sending and receiving data objects through network 56 which are formed in accordance with an industry standard. In the particular embodiment illustrated in FIG. 2, host computer 52 includes a number of different identification card applications 58 and 60 along with a browser client 64 which couples through an IP (Internet Protocol) driver 66 to communication network 56. Applications 58-60 can be configured, for example, as plug-ins to browser 64 and communicate with browser 64 through a plug-in interface. Alternatives also include card applications which are configured in accordance with an HTML or XML form, XML objects, JAVA objects, etc. Example card applications include text or graphics applications, smart card encoding applications, magnetic stripe encoding applications, printer security applications, printer diagnostic applications, bar code applications, etc. In another alternative, a server 68 can provide a direct interface for card applications 58-60 to network 56 such that card applications 58-60 can communicate directly on network 56. For example, interface 68 can provide a data server in accordance with a standard such as (OPC) OLE for Process Control which is an extension to Microsoft OLE (Object Linking & Embedding) OPC, XML, etc.

Printer 54 includes a client 70 and a server 72 for coupling to network 56 and communicating with host 52. Applications 74 run in a microprocessor 76 in the identification card printer 54 under the control of an operating system 78. As explained in more detail below, applications 74 receive data objects from network 56 through client 70. Examples of such objects include images, smart card data, text, video, animation, voice, bar code information or magnetic stripe information. Client 70 can be a browser client or a module of web server 72 which is configured to receive such objects. Applications 74 responsively control hardware drivers 80 to control various types of hardware elements in printer 54 such as a print head 82 or a data writing device 91, which is used to place data onto an identification card 85. Data writing device 91, can be, for example, a magnetic recording head by a magnetic stripe recorder, a smart card encoder, a proximity card encoder, or a bar code writer. Any type of hardware application can be provided to operate other hardware elements, generally depicted at box 93, such as those discussed with respect to FIG. 1 including RFID writers for proximity cards, laminators, feed mechanisms, printer controls, bar code writers, etc. Further, applications 74 are capable of communicating with applications 58 and 60 in host computer 52 through communication network 56 using a server such as a web server 72. Web server 72 can also communicate JAVA applets 86 over network 56. In one aspect, server 72 can serve various data types such as FTP, XML, SMNP, POP including POP3 216, any type of applet, etc.

With present invention, the various types of data objects which are transferred through network 56 can be hardware independent and can be created in accordance with an industry standard data object format such as that provided by XML or OPC. Thus, an image, such as a rasterized photograph for printing on an identification card by printer 54, is transferred to printer 54 in the form of a data object. This data object is not printer specific. Instead, applications 74 which reside in printer 54 are used to perform the final conversion from the standardized format into the particular format required by hardware drivers 80. For example, print head 82 may require a particular format of a bit stream in order to create the image. However, the applications running on host computer 52 do not need any specific knowledge of this format or knowledge of the particular operation of the hardware within printer 54.

Server 72 is also capable of serving other types of data to host computer 52. This data includes diagnostic information 204A, security lockout information, status information 246 related to computer 52, video data 248, audio data 250, voice, etc., some of which are depicted in FIG. 3. For example, server 72 can provide an output in the form of a webpage which contains information regarding the status or diagnostics of printer 54 for display on a browser 64 in host computer 52.

The present invention can utilize any industry standard which is capable of communicating data objects. Two competing technologies are emerging in the personal computing and networking arena The Microsoft and Intel based computer are based on the COM (Component Object Model), DCOM (Distributed COM) and Active X Controls. This object oriented technology base provides for wrapping software functions in a package or object with a standard interface and protocol. This technology enables a high degree of software reuse and permits the distribution of an application over a network. Networked applications permit the execution of an application between a collection of hardware platforms and operating systems.

The second competing technology family is CORBA, JAVA and RNII. These technologies are led by Hewlett Packard and Sun Microsystems. These technologies are also object based and are also capable of networking applications. Java is hardware independent, which results from its Java Virtual Machine (JVM). However, the JVM does add overhead and can reduce performance. This technology is often used with the UNIX operating system. These technologies provide for a change in computing from the single CPU based machine to networked computing.

By applying this technology to identification card printers, the printer becomes a node on the network with capabilities for computing and sharing of networked objects. This expanded role for the identification card printer, as both a client and server of data and objects, provides a new opportunity to solve the dilemma of many custom print drivers and well as providing for new printer functions.

In operation, server 72 will initially receive a request for data from, for example, a remote application 58 in accordance with a communication protocol (e.g., TCP/IP). Next, server 72 interprets the request and obtains the requested data. Finally, server 72 provides the requested data to the remote client in accordance with the communication protocol. Client 70, on the other hand, makes requests for data to remote servers, such as computer 52 shown in FIG. 2. The remote server then processes the request by obtaining the data and sending the data to client in accordance with the communication protocol. As understood by those skilled in the art, these client and server functions cannot be performed by traditional networked printers.

HTML (depicted in FIG. 3 as box 215) and XML are examples of page markup languages that can be used with the invention. XML is a preferred architecture for defining data types, which can be easily parsed. This flexibility provides a clean solution for parsing card graphics, text, magstripe encoding, smart card encoding, etc. It also readily enables communicating new data types such as audio or video. The potential for providing audio instruction or alerting an operator of a printer malfunction from an audio message sent from the printer to a PC is possible.

Typically, identification card printers are embedded software systems consisting of a single or multiple embedded micro controller which are used for network communications, print head control and the other related card manufacturing control tasks. The typical embedded controller is an 8 or 16 bit micro controller such as the Motorola 68HC11 or HC16 family. An embedded micro controller such as the Motorola MPC823 can manage the network communication from a host or client, as well as controlling the electromechanical components of the printer.

The software control in such microprocessors typically employs a "round robin" or interrupts driven architecture with a single software thread. The use of a kernel can improve performance and permits multi-threading similar to that used on PC platforms for running multiple applications at the same time. One such architecture is shown and described in co-pending application Ser. No. 09/477,970, filed Jan. 5, 2000 and entitled PRINTER OR LAMINATOR WITH MULTI-THREADED PROGRAM ARCHITECTURE which is incorporated herein by reference. Preferably, an operating system or kernel provides efficient use of the CPU and to provide for multitasking of communications, printer control etc. for the embedded system of the invention. The embedded system may use a custom, proprietary operating system or a commercial embedded operating system such as the RTXC, Nucleus, Wind River operating system, Microsoft CE or a JAVA based operating system with a Java Virtual Machine.

The present invention is applicable to any type of printer with a primary task receiving a file, object, or bit stream, of text and image data and printing the image and text to a media such as paper, or a plastic card.

In one aspect, server 72 of FIG. 2 is a hybrid server embedded in the micro controller 72 which serves as a client to data hosted by a networked host such as a PC 64 or an additional printer. The client subscribes to data such as the print file or encoding information or objects. The hybrid server can also serve data such as printer health over the network to other clients such as a PC, a remote PC or another printer. In one aspect, the hybrid server is capable of executing a networked application where part or all of the computing is performed in the printer and other portions may be performed on the networked hosts or other serving devices such as printers or cameras. Example object servers include OPC and RPC, COBRA and JAVA. Other object based network servers can operate with compatible networked applications. The protocol for the object based-messaging is also not critical, but the preferred protocols will be the internet based protocols such as TCP, UDP, IP, ICC, RPC, XML, HTTP, SNMP, CDPD, RMI, IIOP, etc. This protocol can run on top of IP. TCP is preferred for Internet based usage due to its robustness. UDP will suffice for direct connect or short distance Intranet usage where robustness is not as important. The printer will typically include an appropriate media driver, e.g., Ethernet 10BT, 100MB, ATM, USB, parallel, serial, etc. Internet webpage technologies include XML, HTML, etc. The invention is capable of serving as a webpage host or client. A web browser based printer was previously disclosed. The printer must have the appropriate media driver. In general, the printer can serve or subscribe to objects such as the D-COM/Active X Controls or the JAVA derivative CORBA or Enterprise Java Beans (EJB). An OPC based hybrid server and/or an RPC and Java based server.

In one aspect, the identification card printer can serve or subscribe to objects such as the DCOM/Active x Controls or the JAVA derivative EJB, or CORBA ORBS. This invention can be used as a node of a network. The network may include a computer such as a PC, a mainframe, etc. Preferably, the networked hybrid server printer uses a technology base that is compatible with the network and the host application. A solution for the Microsoft family employs DCOM/Active X technologies with an OPC hybrid server.

One preferred embodiment combines a Java based embedded hybrid server with a DCOM object based host server, which enables the identification card printer to interoperate with all host computer applications.

In one embodiment, the printer also operates as a server to other networked printers. In this aspect, the printer can serve data or objects to a second printer such as a load sharing printer, which acts as a client and is able to subscribe to objects being served from printer.

In one aspect, the invention can also be used as an integrated standalone unit where the host application runs on the printer. The printer can be networked with other devices such as digital camera and other printers that are clients.

In one aspect, the printer 54 can provide audio and/or video data 250 or 248, respectively, to the browser 64 to alert the user to problems with the printer, as indicated in FIG. 3. An audio message is sent to the PC speaker system to alert the user to the need to replace supplies, service the printer etc. The web server 72 of the printer 54 can contain audio/video data files which can be uploaded to the network PC and played with a video application to illustrate to a user how to use the printer or show an animated video of where a problem is located in the printer (card jam, motor failed, out of supply etc).

XML can also be used to communicate security data between the PC 52 and the printer 54. Cards for financial purposes often require a secure system to avoid the use of the printer to make fraudulent credit cards, driver's licenses, etc. A public key/private key system is often used to provide security. A database of public keys is included in the PC resident application and an operator is required to use their private key to operate the machine. XML provides an ability to identify a special data type for the public key and the encrypted private key.

In general, the embedded XML parser in client 70 and/or server 72 in the printer 54 is able to parse incoming data based upon data type, and route the data to the appropriate application in the printer. For example, the print file image or text data is routed to the printing application, the magstripe encoding data is routed to the mag application, etc. Conversely, the XML parser can assemble a message sent by the printer over the network to other networked devices, such as the PC 52, and can include data such as alarms and alerts, security key, video and audio simulation of a card jam, email a message to service provider etc.

Examples of various types of data that can be transmitted to or from the printer 54 in accordance with a standardized data format include:

TABLE 1

| XML ID Card Printer Data Types | |
|---|---|
| Print File | Image Data |
|  | Text Data |
|  | Bar Code Data |
| Mag Stripe | Encoding Data |
|  | Public Key |
|  | Private Key |
| Prox Card | Encoding Data |
|  | Public Key |
|  | Private Key |
| Smart card | Encoding Data |
|  | Public Key |
|  | Private Key |
| Lamination | Card Material Geometry Data |
|  | Film Material/Geometry Data |
|  | Lamination Parameters |
|  | Public Key |
|  | Private Key |
|  | User ID (Security) |
|  | Lamination ID (Security) |
|  | Supplies History |
| Configuration | Print Head Settings |
|  | Lamination Settings |
|  | Application Specific Settings |
|  | Control Constants |
|  | Lamination Tables |

TABLE 1-continued

| XML ID Card Printer Data Types | |
|---|---|
|  | Networking |
| Biometrics | Public Key |
|  | Private Key |
|  | Finger Print |
|  | Voice Print |
| Instructions | Audio Data |
|  | Video Data |
|  | Animation Data |
| Diagnostics | Printer Failure Data |
|  | Audio Data |
|  | Security Data |
| Email Message | Text |
|  | Video |
|  | Audit |
| Prox Card | Encoding Data |
|  | Public Key |
|  | Private Key |

FIG. 3 is a simplified diagram of a networked system 150 which includes a personal computer 152 coupled to an identification card printer 154 through a network 156. FIG. 3 illustrates the various layers of computer 152 and printer 154. Computer 152 is shown running applications 158 and 160 along with a browser client 162. These applications interact and operate through an operating system 164 through a spooler 166 and GDI 168. A language monitor 170 and port monitor 172 couples to operating system 164. In one example, a language monitor and port monitor is shown and described in co-pending U.S. patent application Ser. No. 09/571,110, filed May 15, 2000, and entitled IDENTIFICATION CARD PRINTER INTERFACE which is incorporated herein by reference. In XML parser 174 is also provided in personal computer 150. Language monitor 170, port monitor 172 and XML parser 174 cooperate with a TCP/IP layer 176 which formats data and receives data from network 156. Network 156 can be configured in accordance with any data communication standard and can be a point-to-point link such as that provided by a serial data bus or other extensions of such standards such as USB, fire wire or others that may become available.

Printer 154 includes a communication layer 180 configured to send and receive data on network 156 in accordance with the TCP/IP standard. Software on printer 154 operates under the control of kernel and kernel services 182 which is run on a microprocessor 184 such as a Motorola MPC823. Printer 154 also contains an XML parser 186 configured to parse data received from network 156. Printer 154 runs a browser client 188 capable of receiving, for example, data formatted in accordance with the HTTP or XML standards. Further, printer 154 can run server software such as a web server 190, or an SNMP server 192, or an SMTP server 214. With these layers, printer 154 is capable of transmitting information to a browser client, such as browser client 162, over network 156. Further SNMP server 192 can be used to send notification in accordance with an e-mail standard to a remote location. The various software layers in printer 154 interact with embedded printer applications 194 for printing and encoding an identification card 85 shown in FIG. 1. Embedded printer applications 194 can also include other types of printer applications, such as lamination applications 230 to laminate an identification card, security applications 232, smart card encoding applications 234, magnetic stripe encoding applications 236, proximity card encoding applications 238, printer configuration applications 240, status applications 242, diagnostic applications 244, and others.

In the embodiment illustrated in FIG. 3, personal computer 152 is used to create an identification card using, for example, applications 158 and 160 and/or browser 162. The applications can be standardized applications or, if a browser is used to prepare an identification card, a format embodied on a web page can be provided to an operator which is generated by web server 190 in printer 154. Further, printer 154 can provide pointers using, for example, the URL standard, such as an IP address 202 (FIG. 3), to a remote web server 206 which provides an identification card format 209, as shown in FIG. 3. Such a remote web server can exist at the manufacturer of the identification card printer or at a centralized location such as, for example, a central government office used to provide the format for drivers licenses. Printer 154 can also provide operation instructions 252 (FIG. 3) to browser client 162 or provide a pointer (e.g., IP address 202), to a remote location which contains such instructions 208. In one aspect, printer 154 is capable of receiving software updates 254 through network 156 from a remote location, such as remote server 206, using XML parser 186 or browser client 188. The P address 202 can be a pointer to the software updates 254.

In one aspect, printer 154 can provide diagnostic information 204A and status information 246 over a network, shown in FIG. 3. This data can be provided in accordance with the techniques set forth herein. In this aspect, the printer can be monitored and conditions diagnosed from remote locations. Further, the diagnostics can be performed on a remote system, such as a remote server 206, which may have more advanced diagnostic algorithms and information 204B and techniques provide greater computational power than printer 154. The IP address 202 can be a pointer to the diagnostic algorithms and information 204B.

In general, printer 154 is provided for printing an image onto a medium such as an identification card 85 shown in FIG. 2. A print mechanism such as print head 82 is adapted to deposit material onto the identification card. A network adapter such as communication layer 180 is configured to couple to network 156. A print driver module is part of the embedded printer 154 and is configured to drive the print head 82 in response to a drive module input which is provided by, for example, browser 188 or XML parser 186. Browser 188, XML parser 186 and web server 190 provide a client/server module which is coupled to the communication layer 180 and is configured to function as a client on the network 186 and responsively provide data to the drive module input of embedded printer applications 194. Further, the client/server module is configured to function as a server on the network 156 and serve data onto the network. The client/server module is adapted to communicate with the network 156 in accordance with a communication protocol. In one aspect, printer 154 contains an Internet Protocol (IP) address for use by communication layer 180 which uniquely identifies printer 154 on network 156.

As discussed above, in one aspect of the invention data is communicated to the printer using XML or extensible markup language. XML allows for the generic description of data. That is, it can be used to define data without the application knowing what the format is ahead of time. This is achieved through the use of a DTD, or Data Type Definition. Another type of data definition is called a SCHEMA. The XML parser reads in this DTD and then formats the data in accordance to the rules contained. This allows the parser to check the syntax as well as resolve any entities. An internet appliance can benefit from this through the use of ubiquitous data. This appliance can receive any data that may be of benefit and use it without knowing its format. Conversely, data can be presented in such a way that it can be resolved to mean different things to different appliances.

XML can contain any type of data, that is it can contain binary, replaceable text, processing instructions and tags. The following is a description of some of these types, it should be noted that these data types are not all inclusive.

Binary data in XML is represented by the CDATA tag. This tag allows anything that resides between the symbols <![CDATA and]]> to be ignored by the parser. This allows any character, within the Unicode set that XML understands, to be inserted. This effectively allows any binary data to be included in this block. As an example, sound is represented as a binary file. A program can translate the information into sound, for example. This technique can be used to encapsulate any type of data in an XML document. Doing so allows a document to contain very rich content.

Replaceable Text or an Entity can be parsed or non-parsed text. Replaceable text is of the parsed kind. This allows a parser to replace each occurrence with the contents of the defined entity. An example of an entity definition would be:

```
<!ENTITY%pub"ÉditionsFargo">
<!ENTITY rights "All rights reserved">
<!ENTITY book "Instruction Manual,
© 2000 %pub;.&rights;">
```

This would then be resolved by the parser as:
Instruction Manual,
© 2000 Editions Fargo.&rights;

The "&rights" reference would be expanded should the "&book" reference appear in the document.

A processing instruction allows a document to contain instructions for the application. This allows the application to use these instructions without the parser interpreting them. An example would be:
<? Printer color=blue?>

This instruction is passed to the application as a printer instruction with the variable color set to blue. The most common form of this instruction is the XML declaration itself.

A tag is denoted by the start tag/end tag sequence. An example is <color> #x3</color>. This defines the value of color to be 3, as denoted by the hexadecimal number between the tags. This tag sequence can be defined in the DTD and can be validated against the definition of the tag.

Using the DTD that XML provides, the data type used by the printer to render an image can be described. If an image is considered a collection of objects that form a document, then this document can be described in an orderly method using XML. Utilizing XML to provide the document description allows for a portable format that is removed from the application.

To print a document on a printer, the printer first breaks down each element into a collection of objects that reside on the card. These can be different for each card. XML even includes syntax to describe data that does not need to be present for all documents. Taking this into account all the elements that comprise a card can be included and it can be specified what the minimum configuration is and printing then requires only those elements. As each object is included on the document, it is then possible to describe a set of rules that would come into effect when an application uses that particular object. This allows for the maximum flexibility without creating an overly complex document.

The DTD can contain definitions for such elements in the document as:
Document Version
Image Data
Text Data
Barcode Data
MagStripe Data
Smart card Data
Lamination Data
Configuration Data
Biometric Data
Multimedia Data
Diagnostic Data
Video Instruction Data
Audio Data Each of these elements can be broken down to their component pieces. For example Image Data could contain:
Data Source
Color Heat Setting
Image Type
Data Collection Method
Encryption Type
Encryption Key
Picture position
Picture Gamma Correction While not all of these elements are needed to describe a picture, they do describe all the properties that a picture can contain. Those not needed are set to optional. Once each element of a document is described, the complete layout of the card should be descriptive enough to handle any occurrence. When new methods for encryption, media collection, or data manipulation are created, the version number can be used to differentiate this data from the old data. This allows for flexibility without sacrificing the integrity of the data.

In summary, identification card printer 54 having client 70 server 72 performs substantially different from traditional networked printers. In particular, traditional network printers are typically output devices that process print jobs received over the network. Occasionally, these printers may include alarms that are triggered automatically when certain conditions exist causing the printer to provide information on its status. However, this is not the equivalent to that of the server aspect of identification card printer 54 that provides information in response to a request for the information. As mentioned above, this serving ability allows printer 54 to dynamically provide data as needed by the subscribing client, which could be a diagnostic application running on a host computer such as application 58 (FIG. 2). Thus, when the remote application changes, or requires different data, printer 54 can respond with the newly requested data unlike traditional networked printers that do not modify the data that is provided in response to a request.

Also, traditional printers lack the present invention's client aspect that allows printer 54 to subscribe to data over the network. This allows printer 54 to, for example, request instructions 208 (FIG. 3) or other data from a remote server on the network that may be used by printer 54. For example, printer 54 may obtain security data through client 70 that is used to encode a card with a security code. One benefit of this aspect of the invention is that the data sent to client 70 can be updated at a central remote location. Thus, for example, a software update 254 (FIG. 3) for printer 54 can be located at a remote computer, which can then be accessed by the client 70 of printer 54.

Although the present invention has been described with reference to preferred embodiments, workers skilled in the art will recognize that changes may be made in form and detail without departing from the spirit and scope of the invention.

What is claimed is:

1. An identification card printer, comprising:
a print mechanism adapted to deposit material on to a plastic card;
a network adapter configured to couple to a network;
a print drive module configured to control the print mechanism in response to a drive module input;
a client/server module coupled to the network adapter and configured to communicate with the network in accordance with a protocol, produce client requests for data from remote servers, receive incoming data from the remote servers in response to the client requests, receive server requests for data from remote clients, and serve outgoing data to the remote clients in response to the server requests;
a data parser adapted to route data to applications of the printer to which they relate;
a smart card encoder configured to encode data to the plastic card; and
a smart card encoding application configured to encode smart card encoding data received from the data parser to the plastic card using the smart card encoder.

2. The identification card printer of claim 1 including a network address in accordance with an Internet Protocol (IP).

3. The identification card printer of claim 1 wherein the client/server module serves diagnostic information on the network.

4. The identification card printer of claim 1 wherein the client/server module is configured to receive the incoming data in accordance with an object based data structure which contains data objects for writing onto the card.

5. The identification card printer of claim 4 wherein the object based data structure comprises XML.

6. The identification card printer of claim 1 wherein the client/server module is configured to serve the outgoing data in accordance with an HTML standard.

7. The identification card printer of claim 1 wherein the client/server module is configured to serve a network address of another node on the network, the network address in accordance with the Internet Protocol (IP).

8. The identification card printer of claim 7 wherein the IP address is a pointer to instructions located on a remote server.

9. The identification card printer of claim 7 wherein the IP address is a pointer which points to diagnostic information on a remote server.

10. The identification card printer of claim 9 wherein the client/server module serves diagnostic data to a remote client.

11. The identification card printer of claim 7 wherein the IP address is a pointer which points to a card format located on a remote server.

12. The identification card printer of claim 7 wherein the IP address is a pointer which points to a location for receiving software updates from a remote server.

13. The identification card printer of claim 1 wherein the client/server module is configured to provide printer status information.

14. The identification card printer of claim 1 wherein the network adapter is configured to couple to Ethernet.

15. The identification card printer of claim 1 including an operating system to support the client/server module, the operating system providing multi-threaded operation.

16. The identification card printer of claim 1 wherein the client/server module comprises an SNMP server.

17. The identification card printer of claim 1 wherein the client/server module comprises an SMTP server.

18. The identification card printer of claim 1 wherein the client/server module comprises a POP3 email server.

19. The identification card printer of claim 1 including a laminator and a laminating application, wherein the data parser directs laminator related data to the lamination application, which controls operations of the laminator in response to the laminator related data.

20. The identification card printer of claim 1, further comprising a magnetic stripe recorder.

21. The identification card printer of claim 1, further comprising a proximity card encoder and a proximity card encoding application configured to encode proximity card encoding data received from the data parser to the plastic card using the proximity card encoder.

22. The identification card printer of claim 1, further comprising a bar code writer.

23. The identification card printer of claim 21, wherein the proximity card encoder is configured to write RFID data to the plastic card.

24. The identification card printer of claim 1 wherein the client/server module is configured to serve an applet.

25. The identification card printer of claim 24 wherein the applet is in accordance with JAVA.

26. The identification card printer of claim 4 wherein data objects are definable by a protocol of the object based data structure.

27. The identification card printer of claim 1 wherein the client/server module is configured to serve audio data.

28. The identification card printer of claim 1 wherein the client/server module is configured to serve video data.

29. The identification card printer of claim 1 wherein the client/server module is configured to serve print data to a remote printer coupled to the network.

30. The identification card printer of claim 1 wherein the client/server module is configured to receive data in accordance with the XML standard.

31. The identification card printer of claim 1 wherein the client/server module is configured to receive security data in accordance with a public/private key encoding standard.

32. An identification card printer for producing an identification card, comprising:
a print mechanism adapted to deposit material on to a plastic card;
a network adapter configured to couple to a network;
a client/server module coupled to the network adapter and configured to communicate with the network in accordance with a protocol, produce client requests for data from remote servers, receive incoming data in the form of data objects from the remote servers, receive requests for data from remote clients, and serve data in the form of data objects to the remote clients in response to the requests,
a data parser adapted to route to applications of the printer to which they relates;
a proximity card encoder configured to encode data to the plastic card; and
a proximity card encoding application configured to encode proximity card encoding data received from the data parser to the plastic card using the proximity card encoder.

33. The identification card printer of claim 32, further comprising a data writing device that is controlled in response to data from the data parser, wherein the data writing device is selected from the group consisting of a magnetic stripe recorder controlled by a magnetic stripe recording application, a smart card encoder controlled by a smart card encoding application, and a bar code writer controlled by a bar code writing application.

34. The identification card printer of claim 32 wherein the protocol is based on an object based data structure.

35. The identification card printer of claim 34 wherein the object based data structure comprises XML.

36. The identification card printer of claim 32 wherein the client/server module is configured to serve data in accordance with an HTML standard.

37. The identification card printer of claim 32 wherein the client/server module is configured to serve a network address of another node on the network, the network address in accordance with the Internet Protocol (IP).

38. The identification card printer of claim 37 wherein the IP address is a pointer to instructions located on a remote server.

39. The identification card printer of claim 37 wherein the IP address is a pointer that points to a remote system that is adapted to perform diagnostics on the printer.

40. The identification card printer of claim 39 wherein the client/server module serves diagnostic data to a remote client.

41. The identification card printer of claim 37 wherein the IP address is a pointer which points to a card format located on a remote server.

42. The identification card printer of claim 37 wherein the IP address is a pointer which points to a location for receiving software updates from a remote server.

43. The identification card printer of claim 32 wherein the server is configured to provide printer status information.

44. The identification card printer of claim 32 wherein the network adapter is configured to couple to Ethernet.

45. The identification card printer of claim 32 including an operating system to support the client/server module, the operating system providing multi-threaded operation.

46. The identification card printer of claim 32 wherein the server comprises an SNMP server.

47. The identification card printer of claim 32 wherein the server comprises an SMTP server.

48. The identification card printer of claim 32 wherein the server comprises a POP3 email server.

49. The identification card printer of claim 32, further comprising a laminator and a lamination application configured to laminate the plastic card in response to laminator related data received from the data parser.

50. The identification card printer of claim 32 wherein the client/server module is configured to serve an applet.

51. The identification card printer of claim 50 wherein the applet is in accordance with JAVA.

52. The identification card printer of claim 34 wherein the data objects are definable by the protocol.

53. The identification card printer of claim 32 wherein the client/server module is configured to serve audio data.

54. The identification card printer of claim 32 wherein the client/server module is configured to serve video data.

55. The identification card printer of claim 32 wherein the client/server module is configured to serve audio data.

56. The identification card printer of claim 32 wherein the client/server module is configured to serve print data to a remote printer coupled to the network.

57. The identification card printer of claim 32 wherein the client/server module is configured to receive data in accordance with the XML standard.

58. The identification card printer of claim 32 wherein the client/server module is configured to receive security data in accordance with a public/private key encoding standard.

59. The identification card printer of claim 32, further comprising:

a smart card encoder configured to encode data to the plastic card; and a smart card encoding application configured to encode smart card encoding data received from the data parser to the plastic card using the smart card encoder.

* * * * *